W. F. WELLER.
Root-Cutter.

No. 207,144. Patented Aug. 20, 1878.

WITNESSES
J. N. Perkins.
Will Sanders Jr.

INVENTOR
William F. Weller
Per George W. Hey
Atty.

UNITED STATES PATENT OFFICE.

WILLIAM F. WELLER, OF LIVERPOOL, NEW YORK.

IMPROVEMENT IN ROOT-CUTTERS.

Specification forming part of Letters Patent No. 207,144, dated August 20, 1878; application filed March 2, 1878.

*To all whom it may concern:*

Be it known that I, WILLIAM F. WELLER, of Liverpool, in the county of Onondaga and State of New York, have invented a certain new and useful Improvement in Root-Cutters; and I declare the following to be such a full and complete description of the same as to enable any person skilled in the art to which it pertains to make and use the same.

The object of my invention is to provide a cutter so constructed and arranged as to readily cut beets and other roots into small slices without clogging, and to accomplish the work with great rapidity.

Many attempts have been made to construct root-cutters with cylindrical or funnel-shaped hoppers attached to the frames on a slant or in a vertical position, the cutting-knives being carried upon a circular disk of metal sustained upon a journal-shaft at right angles thereto, while the disk carrying the cutters, as described, has been a desirable device, presenting many advantages over other devices for operating the cutting-knives.

The root-cutters hitherto made have been objectionable in consequence of their liability to clog up or choke, and the slow process of feeding and keeping them clear in order to work them. To overcome this defect I have invented a peculiarly-constructed hopper, which is provided with a vertical bearing or breast, formed by one of its plane sides, which permits the roots to drop down close to the cutting center of the disk upon which the knives are carried, and are there held by the weight of the roots on top of each other. The roots as cut are discharged through throats or slots immediately under the lateral cutting-knives in the disk.

To facilitate the cut and discharge, so as to obtain the best practical results, I found it necessary to attach the cutter-carrying disk to the journal-shaft upon which it revolves on a slant of about sixty degrees.

Figure 1:
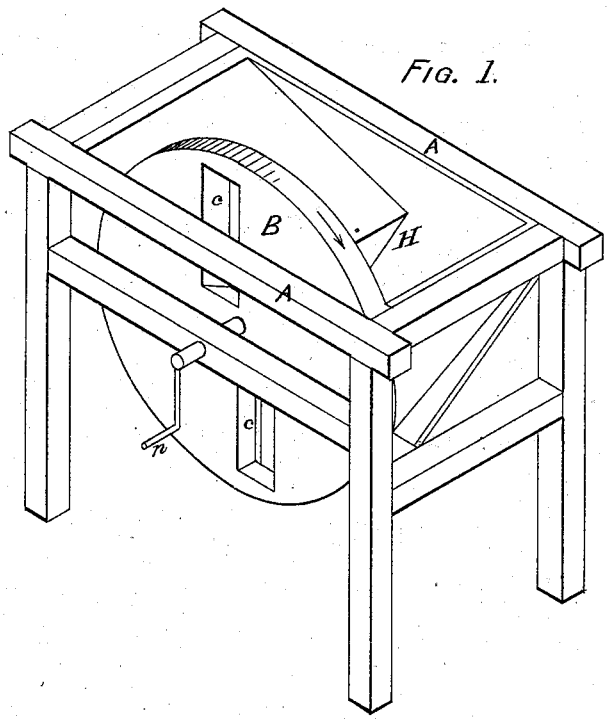
Figure 2:
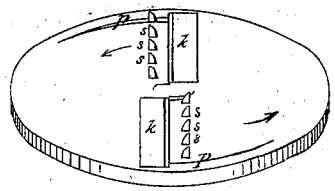

The construction and devices are more specifically set forth as follows, in which reference is had to the accompanying drawing, forming a part of this specification:

Figure 1 is a perspective view of my improved root-cutter, showing the hopper and discharging-throat in the outer side of the cutter-carrying disk; Fig. 2, the disk detached, showing inner side or face.

Like letters indicate corresponding parts.

The letter A represents the frame supporting the hopper H, constructed, as shown, in two sections, with inclined sides slanting at right angles with each other, their intersecting side being vertical, so as to form a breast or bearing for the roots. This peculiar construction allows the roots to fall down close to the cutting center of the disk B, and they are firmly held by the breast and the weight of the roots in the upper section of the hopper. The cutter-carrying disk is shown at B, and is journaled upon and in the frame A, suspended on a slant with its shaft at an angle of about sixty degrees, so that its lateral cutters coincide closely with the incline of the hopper. The disk may be made of wood or metal, of sufficient weight to secure ease in running.

I provide two flat long knives, $k$, on its inner face, placed opposite to each other and over the throat $c$. At a point, $s$, directly in front of the cutting-edge, I place a system of vertical cutting-knives similar to those shown in the patent of G. B. Massey. A groove, $p$, Fig. 2, facilitates the passage of the sliced roots to the discharging-throat $c$. The inner face of the cutter-carrying disk is brought close up to the hopper, and its slant, in connection with the set of the lateral cutters, facilitates the discharge of sliced roots through the throat $c$.

It will be apparent that clogging is entirely obviated, and that the operation of the cutter is continuous, contingent only to the supply of roots in the hopper.

The machine is compact, the working parts made of metal, and is exceedingly strong and durable.

I do not consider the arrangement of cutters on the disk as new, although somewhat different from those shown in other inventions; but

What I claim as new, and desire to secure by Letters Patent, is—

The hopper H, constructed in two sections, with inclined sides slanting at right angles to each other, provided at their intersection with a vertical bearing or breast, in combination with the cutter-carrying disk B, provided with a discharging-throat, c, attached on a slant to a crank-shaft, and the driver n, the devices being adapted to be applied to a root-cutter, substantially as herein set forth and specified.

In testimony whereof I have set my hand this 28th day of February, 1878.

WILLIAM F. WELLER.

Witnesses:
WILL SANDERS, Jr.,
J. N. PERKINS.